Inventor:
WERNER BLEICKARDT
BY Rupert J. Brady
ATTORNEY

Inventor:
WERNER BLEICKARDT
BY Rupert J. Brady
ATTORNEY

United States Patent Office 3,349,332

Patented Oct. 24, 1967

3,349,332

ELECTRONIC COUNTER FOR COUNTING IN THE GRAY CODE BINARY PULSES

Werner Bleickardt, Bern, Switzerland, assignor to Hasler, A.G., Bern, Switzerland, a Swiss company Filed Oct. 4, 1965, Ser. No. 492,560
Claims priority, application Switzerland, Oct. 7, 1964, 12,916/64
5 Claims. (Cl. 328—42)

ABSTRACT OF THE DISCLOSURE

An electronic counter for counting in the Gray code binary pulses having a series of flip-flops. On each pulse to be counted only one flip-flop changes its position whereby this flip-flop is determined by the state of the preceding flip-flops of the series, and the direction of change of position of the flip-flop is determined by the sum modulo 2 of the positions of the succeeding flip-flops of the series.

The invention relates to an electronic counter circuit for binary pulses which appear alternately at one of two input poles.

An object of the invention is to provide a counter circuit of this kind which has in each counter stage only one single bistable circuit. Furthermore the counting result should be capable of being read off both in the Gray code and in the usual dual code. In operation of the circuit only one of the bistable circuits should change its state on each counter pulse. The circuit should also be suitable for operating with a large number of stages and furthermore be so operable that the direction of counting (forwards, backwards) is electrically reversible.

The counter circuit according to the invention is characterised in that each stage has a single bistable circuit with a set input and a reset input and a set output and a reset output, and two and-gates, the output of one and-gate is connected to the set input and the output of the other and-gate is connected to the reset input of the bistable circuit. One input pole *a* of the counter is connected with inputs of the and-gates from the stages of the second lowest to the highest orders and the other input pole *b* is connected with one input of the and-gate of each stage of lowest order, the and-gates of the stage of lowest order are controlled by the sum "module 2" of the states of the bistable circuits of all other stages, the and-gates of each of the stages of second lowest to highest order are controlled by the states of the bistable circuits of all stages of lower order and the sum "module 2" of the states of the bistable circuits of all stages of higher order, and the and-gates of the stage of the highest order are controlled by the states of the bistable circuits of all other stages in such a way that the bistable circuit at any time changing its state under the influence of a pulse at one input pole *a* is determined by the states of the bistable circuits of lower order and the input of that bistable circuit associated with this change of state is determined by the sum "module 2" of the states of the bistable circuits of all the stages of higher order.

Embodiments of the invention will now be described, by way of example, with reference to the accompanying diagrammatic drawings, in which.

Figure 1:
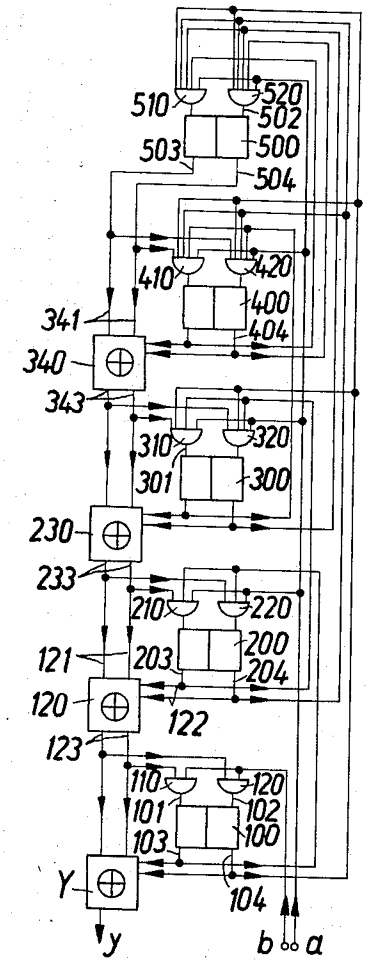
FIG. 1 is a counter circuit for counting in one direction.

The counter circuit according to FIG. 1 has five stages each with a flip-flop, the latter being numbered 100, 200, 300, 400 and 500. The flip-flop 100 belongs to the stage of lowest order and the flip-flop 500 belongs to the stage of highest order or last stage. Flip-flop 300 is in the second from last stage and flip-flop 200 is in the third from last stage. Each flip-flop has an asymmetrical input, i.e. two input poles, for example 101 (set input) and 102 (reset input), and two outputs, for example 103 (set output) and 104 (reset output). If the output 103 has a potential 1 or 0, the flip-flop is in the set or reset state, respectively. A pulse at the input 101 or 102 changes the flip-flop 100 into the set or reset state, respectively. The same holds for the other flip-flops 200 to 500.

To each of the inputs of the flip-flops, the output of an and-gate is connected, for example, the outputs of the and-gates 110 and 120 are connected to the inputs 101 and 102.

Figure 2:
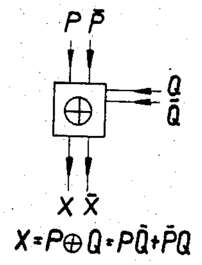
FIG. 2 shows the symbol of a comparator circuit used in FIGS. 1, 4 and 5.

The circuit has four binary comparator circuits (exclusive-or-gates) 120, 230, 340 and Y, which are represented by the symbol according to FIG. 2. Each comparator circuit has a first bipolar input, for example 121, a second bipolar input, for example 122 and a *n* bipolar output, for example 123. In FIG. 2, the input poles are denoted generally by $P\overline{P}$ and $Q\overline{Q}$ and the output poles are denoted generally by $X\overline{X}$. The output is in 1 or 0 when both inputs are in different or similar states respectively. This relationship is expressed in terms of Boolean algebra:

$$X=P\oplus Q=PQ'+P'Q$$

The circuit has an input pole *a* and an input pole *b*. The input pole *a* is connected with inputs of the and-gates 210, 220, 310, 320, 410, 420, 510 and 520 of the flip-flops of the stages of second-lowest to highest order. The other input pole *b* is connected to inputs of the and-gates 110 and 120 of the flip-flop 100 of the stage of lowest order.

The set output of each of the flip-flops 100, 200, 300 and 400 is connected with an input of both and-gates of the flip-flop of the stage of next higher order, for example, 103 with 210 and 220. The reset output of each of the flip-flops 100, 200 and 300 is connected each with an input of the two and-gates of the flip-flop of the stages with an order number greater by two and more, for example, 104 with 310, 320, 410, 420 and 510, 520. The reset output 404 of the flip-flop 400 is connected to the and-gate 520 of the reset input 502 of the flip-flop 500.

The comparator circuits 340, 230, 120 and Y form a chain in which each output of a comparator circuit is connected with the input of the next comparator circuit, for example 233 with 121, and to inputs of the and-gates of one of the flip-flops, and the other input is connected to the outputs of this flip-flop, for example, the input 121 connected to the output 233 is connected with the and-gates 210 and 220 of the flip-flop 200, and the other input 122 is connected to the outputs 203 and 204 of this flip-flop 200. The first input 341 at one end of the chain of comparator circuits is connected to the outputs 503 and 504 of the flip-flop 500.

The manner of operation of the circuit according to FIG. 1 is as follows:

The state of the output of each of the comparator circuits Y, 120, 230, 340 is dependent on the states of all the flip-flops connected directly or indirectly through further comparator circuits with the input of this comparator circuit and, on the basis of the above given formula, in such a way that the state of the output of each comparator circuit is equal to the sum "module 2" of the states of the said flip-flops, that is, that in each case the gate of the first input of a flip-flop connected to the output of the appropriate comparator circuit is open (or closed) and that the and-gate connected to the second input of this flip-flop is closed (or open) when an even (or uneven) number of flip-flops of the stages of higher order are in the set state.

It is first assumed that all the flip-flops are in the reset state. Then, as hereinbefore explained, the and-gate 110 is open and the and-gate 120 is closed. A pulse at the input pole *b* is then passed through the and-gate 110 to the input 101 and reverses the flip-flop 100 into the set state. In this state, the output 103 has a voltage which passes to the gates 210 and 220. This voltage, together with the output voltage of the comparator circuit 230, causes the opening of the and-gate 210 and leaves the gate 220 closed. The next pulse appearing at the input pole *a* thus passes the and-gate 210 and reverses the flip-flop 200 into the set state. The flip-flops 300, 400 and 500 to the and-gates of which this pulse is also fed, do not reverse because inputs of these and-gates are connected to the output 104, which is in state 0. Through the reversing of the flip-flop 200, the output of the comparator circuit 120 changes its state, by which means the and-gate 110 is closed and the and-gate 120 opened. The next pulse at the input pole *b* therefore passes through the gate 120 to the input 102 and reverses the flip-flop 100 into the reset state. This state corresponds to an output voltage at the output 104 which is fed to all the and-gates of the flip-flops 300, 400 and 500. There is no longer any voltage at the output 103 so that the gates 210 and 220 are closed. Since the flip-flop 200 is in the set state, it passes a voltage to the output 203 which voltage causes the gates 310 and 320 to open while the and-gates 410, 420, 510 and 520 which are connected to the output 204 are closed. The voltage appearing at the output of the comparator circuit 340 together with the voltages coming from the output 104 and the output 203 opens the and-gate 310 and keeps the and-gate 320 closed. Consequently, the next pulse appearing at the input pole *a* passes to the input 301 and reverses the flip-flop 300 from the reset into the set state. In this way, the counting process proceeds progressively, each of the flip-flops 200, 300, 400 and 500 reversing when all the flip-flops of lower order assume a specified combination of their states.

Figure 3:
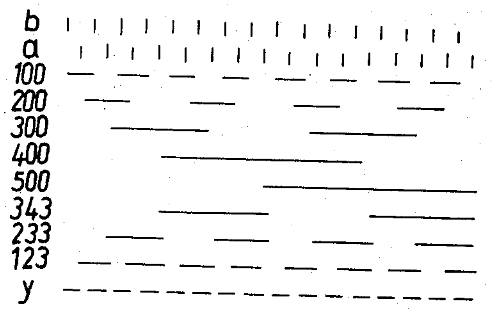
FIG. 3 is a graphic representation of the manner of operation of the circuits of FIGS. 1, 4 and 5.

These processes are illustrated graphically in FIG. 3. In the upper two lines, the pulses, spaced in time, which are to be counted and which appear alternately at one of the two input poles *b* and *a* are shown in each case by a vertical line. The next five lines represent the state of the flip-flops 100, 200, 300, 400 and 500, the set state being represented by a line, and the reset state by a break in this line. In the last four lines, the states of the outputs of the comparator circuits are shown, using the same form of representation. The state at the output of the comparator circuit Y is denoted by *y*.

The states of the outputs of the comparator circuits show the result of the counting process in dual notation, the states of the outputs of the flip-flops show this result according to the Gray code.

Figure 4:
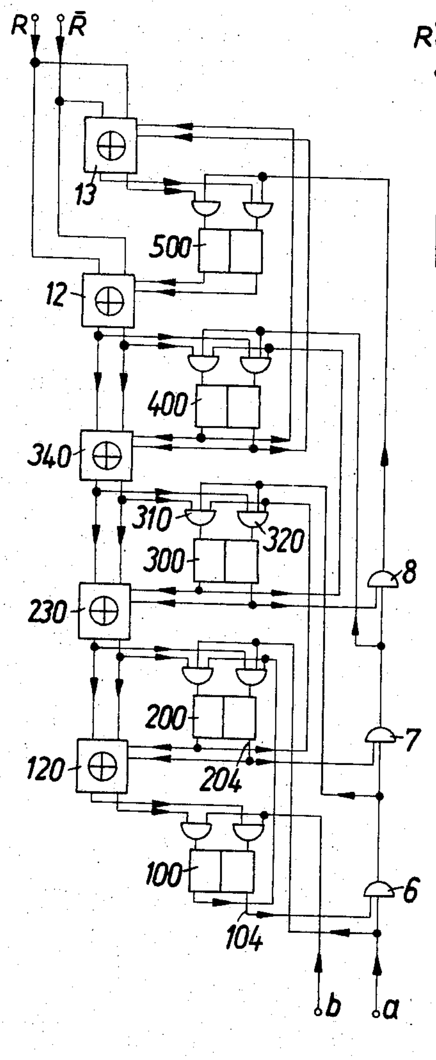
FIGS. 4 and 5 each show a modification of the circuit of FIG. 1.
Figure 5:
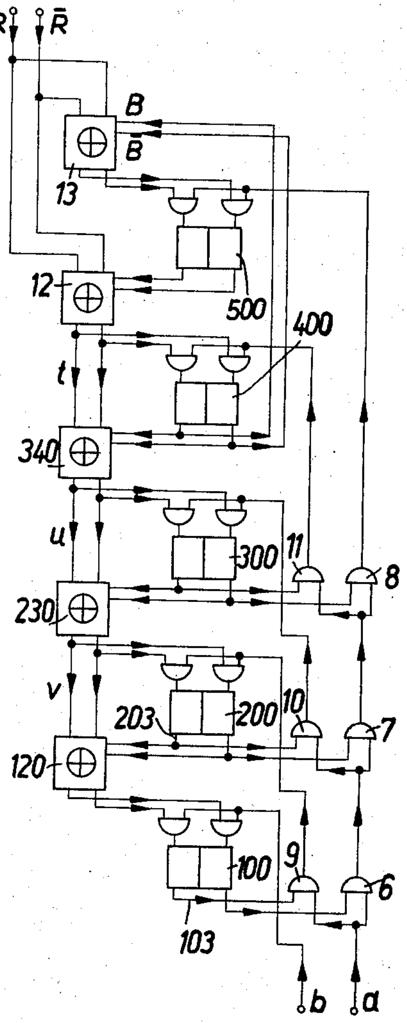

The circuit according to FIG. 1 has five stages, and-gates with up to five inputs being used. If the number of stages is increased, then and-gates with a correspondingly increased number of inputs are also needed. FIGURES 4 and 5 each show a circuit also with five stages, but using and-gates with at most three or only two inputs.

Apart from the additional comparator circuits 12 and 13, the operation of which is hereinafter described, the circuit according to FIG. 4 differs from that according to FIG. 1 in that the connection between the input pole *a* and the inputs of the and-gates of the flip-flops, with the exception that the stage of second-lowest order, contains further and-gates 6, 7 and 8, which form a chain in which the input of and-gates 7 and 8 is connected to the output of and-gate 6 or 7 respectively. The output of each of these and-gates 6, 7 and 8 is connected to inputs of the two and-gates of one of the flip-flops, for example the output of the and-gate 6 to the inputs of the and-gates 310 and 320 of the flip-flop 300. Furthermore, the other input of each of the and-gates of this chain is connected to the reset output of one of the flip-flops, for example, this input of the and-gate 7 to the output 204 of the flip-flop 200.

The circuit according to FIG. 5 has only and-gates with two inputs. It differs from that according to FIG. 4 in that each of the connections between the first input pole *a* and the inputs of the and-gates of the flip-flop, except for those of the stage of highest order, contain in each case one further and-gate 9, 10 and 11, the one input of which is connected with an input of one of the and-gates 6, 7 and 8 of the chain, lying in the chain, and the other input of which is connected to the first output of one of the flip-flops and the output of which is connected in each case to one input of the and-gates of the flip-flop of the stages of the next-highest order. For example, one input of the and-gate 10 is connected with one input of the and-gate 7 and the other input of the and-gate 10 is connected to the set output 203 of the flip-flop 200 and the output of the and-gate 10 to the inputs of the and-gates of the flip-flop 300.

The circuits according to FIGS. 4 and 5 differ from that according to FIG. 1 further in that they have two additional comparator circuits 12 and 13 the first bipolar inputs thereof are connected to two control terminals $R\overline{R}$. The second bipolar input of the comparator circuit 12 is connected to the outputs of the flip-flop 500 and the second bipolar input of the comparator circuit 13 is connected to the output of the flip-flop 400. The bipolar output of the comparator circuit 12 is connected to the input of the chain of comparator circuits 340, 230 and 120 and the output of the comparator circuit 13 is connected to inputs of the two and-gates of the flip-flop 500. Due to the operation of the comparator circuits 12 and 13, the counter chains according to FIGS. 4 and 5 count forwards or backwards, in each case according to the potential of the control terminals $R\overline{R}$, because by reversing this potential, the states at the outputs of all the comparator circuits are reversed, whereby the open and closed states of the gates of the flip-flops and thus the direction of the reversing processes of the flip-flops are changed.

I claim:

1. An electronic counter for counting in the Gray code binary pulses modulo $2^n$, comprising two input poles for receiving alternately said binary pulses, and *n* stages, each stage including one flip-flop, having a set input and a reset input and a set output and a reset output and a first and a second and-gate, each and-gate having a plurality of inputs and one output, the output of the first and-gate is connected to the set input of the flip-flop and the output of the second and-gate is connected to the reset input of the flip-flop, one of said input poles is connected with one input of all and-gates but those of the first stage, the other of said input poles is connected with one input of both and-gates of the first stage, the set output of the flip-flop of each but the last two stages is connected with another input of both and-gates of the next stage, the reset output of the flip-flop of each but the last two stages is connected with a further input of both and-gates of all following stages but the next highest stage, said counter including means for connecting the last two stages as a ring counter consisting in connections between the set and reset output of the flip-flop of one of these stages with an input of the first and second and-gate of the other stage respectively and between the set output and the reset ouput of said other stage with an input of the second and the first and-gate of said one stage respectively, each but the last two stages include an exclusive-or-gate having a first and a second input and one output, the first input of the exclusive-or-gate of the third from last stage is connected to the output of the exclusive-or-gate of the following stage, the first input of the exclusive-or-gate of the second from last stage is connected to the set output of the flip-flop of the last stage, the second inputs of all exclusive-or-gates are connected to the set output of the flip-flop of the following stage, each stage but the last two include a connection between the output of the exclusive-or-gate and a further input of the second and-gate and means for keeping the first gate in a condition opposite to that of the second gate.

2. An electronic counter for counting in the Gray code binary pulses modulo $2^n$, comprising two input poles for receiving alternately said binary pulses, and $n$ stages, each stage including one flip-flop, having a set input and a reset input and a set output and a reset output, and a first and second and-gate, each and-gate having a plurality of inputs and one output, the output of the first and-gate is connected to the set input of the flip-flop and the output of the second and-gate is connected to the reset input of the flip-flop, each stage but the last two including a third and-gate having a first and a second input and an output, the first input of each third and-gate but that of the first stage is connected with the output of the third and-gate of the preceding stage, said counter including a plurality of pairs of connections each comprising a first and a second connection, each of said first connections connecting the first input of one third and-gate with an input of the first and second and-gates of the succeeding stage, each of said second connections connecting the set-output of the flip-flop of one of each but the last two stages with an input of the first and the second and-gates of the next highest stage, the second input of each third and-gate is connected to the reset output of the flip-flop of the same stage, the output of the third and-gate of the second from last stage is connected with one input of the first and the second and-gate of the last stage, the first input of the third and-gate of the first stage is connected with one of said input poles and one input of the first and second and-gate of the second stage, the other of said input poles is connected to one input of the first and second and-gate of the first stage, said counter including means for connecting the last two stages as a ring counter, said means consisting in connections between the set output and reset output of the flip-flop of one of these stages with an input of the first and second and-gate of the other stage respectively and between the set output and reset output of the other of these stages with an input of the second and the first and-gate of said one stage respectively, each but the last two stages include an exclusive-or-gate having a first and a second input and one output, the first input of the exclusive-or-gate of the third from last stage is connected to the output of the exclusive-or-gate of the following stage, the first input of the exclusive-or-gate of the second from last stage is connected to the set output of the flip-flop of the last stage, the second inputs of all exclusive-or-gates are connected to the set output of the flip-flop of the following stage, each stage but the last two include a connection between the output of the exclusive-or-gate and a further input of the second and-gate and means for keeping the first gate in a condition opposite to that of the second gate.

3. An electronic counter as claimed in claim 2, wherein each of said pairs of connections is realized by a fourth and-gate having two inputs and one output, one of said inputs is connected to the first input of the third and-gate of the respective stage, the other of said inputs is connected with the set output of the flip-flop of the same stage and said output is connected with one input of the first and second and-gate of the following stage.

4. An electronic counter as claimed in claim 1, wherein said connections between the outputs of the flip-flop of one of the last two stages and inputs of the and-gates of the other of these stages and between the outputs of the flip-flop of said other stage with inputs of the and-gates of said one stage including each an exclusive-or-gate having two inputs and one output, one input being connected with said output of said flip-flop, the output being connected to said input of said and-gate, and the other inputs of the exclusive-or-gates are connected to a control input of the counter adapted to be supplied by a voltage for controlling the direction of counting.

5. An electronic counter as claimed in claim 2, wherein said connections between the outputs of the flip-flop of one of the last two stages and inputs of the and-gates of the other of these stages and between the outputs of the flip-flop of said other stage with inputs of the and-gates of said one stage including each and exclusive-or-gate having two inputs and one output, one input being connected with said output of said flip-flop, the output being connected to said input of said and-gate, and the other inputs of the exclusive-or-gates are connected to a control input of the counter adapted to be supplied by a voltage for controlling the direction of counting.

References Cited

UNITED STATES PATENTS

| | | | |
|---|---|---|---|
| 2,735,005 | 2/1956 | Steele | 328—44 |
| 3,277,380 | 10/1966 | Paufve | 328—42 |

ARTHUR GAUSS, *Primary Examiner.*

S. D. MILLER, *Assistant Examiner.*